United States Patent [19]

Feldman et al.

[11] 3,927,141

[45] Dec. 16, 1975

[54] POLYAMIDE BASE POWDER COATING MATERIAL CONTAINING AN AMINOPLAST CARRYING ALKOXYALKYL GROUPS

[75] Inventors: Rainer Feldman; Uwe Biethan; Karl Adolf Müller, all of Marl; Hans Joachim Panoch, Hullern, all of Germany

[73] Assignee: Chemische Werke Huls Aktiengesellschaft

[22] Filed: Apr. 24, 1973

[21] Appl. No.: 354,072

[30] Foreign Application Priority Data

May 5, 1972  Germany............................ 2222123

[52] U.S. Cl. ................. 260/849; 260/963; 260/966; 260/967
[51] Int. Cl.². ......................................... C08L 61/20
[58] Field of Search..... 260/849, 70 A, 856, 117/21

[56] References Cited
UNITED STATES PATENTS

| | | | |
|---|---|---|---|
| 2,749,257 | 5/1956 | Knup et al. .............................. | 260/70 A |
| 3,378,397 | 4/1968 | Silvestri et al. ...................... | 260/849 |
| 3,639,096 | 2/1972 | Linwood............................ | 260/849 |
| 3,676,172 | 7/1972 | Van Dyk................................ | 117/21 |
| 3,684,564 | 8/1972 | Lefrancola.......................... | 260/850 |
| 3,737,402 | 6/1973 | de Vries.............................. | 260/850 |

FOREIGN PATENTS OR APPLICATIONS 1,694,949   7/1971   Germany

*Primary Examiner*—Murray Tillman
*Assistant Examiner*—J. Ziegler
*Attorney, Agent, or Firm*—Gilbert L. Wells

[57] ABSTRACT

Polyamide base powder coating material from
a. about 95–99.8 percent by weight of a polyamide having an average of about 8–11 aliphatic carbon atoms per carbonamide group;
b. about 0.2–5 percent by weight of an aminoplast carrying alkoxyalkyl groups and
c. about 0.01–2 percent by weight with respect to the sum of (a) and (b) of an acid catalyst which operates at the film forming temperature and does not react with (a) or (b).

14 Claims, No Drawings

POLYAMIDE BASE POWDER COATING MATERIAL CONTAINING AN AMINOPLAST CARRYING ALKOXYALKYL GROUPS

CROSS REFERENCES TO RELATED APPLICATIONS

Applicants claim priority under 35 U.S.C. 119 for application Ser. No. P 2,222,123.4, filed May 5, 1972, in the patent Office of the Federal Republic of Germany. The disclosure of U.S. application Ser. No. 283,966, filed Aug. 28, 1972 is incorporated herein.

Application Ser. No. 283,966 discloses a polylauryllactam powder prepared from polylauryllactam and a copolymer of polylauryllactam.

Applicants also incorporate herein the disclosure of assignee's copending application Ser. No. 354,123, filed Apr. 24, 1973, and having as inventors Rainer Feldmann et al, and entitled "Polyamide Base Powder Coating Material".

BACKGROUND OF THE INVENTION

The object of the invention is polyamide powders for the coating of metals.

The state of the prior art of producing polyamide powders may be ascertained by reference to U.S. Pat. Nos. 2,698,966; 2,742,440; and 2,975,128 of Louis L. Stott; U.S. Pat. No. 3,203,822 of Junker et al; U.S. Pat. No. 3,410,832 of Griehletol; 3,299,009 of Stephen D. Bruck; and the Kirk-Othmer "Encyclopedia of Chemical Technology", 2nd Ed., Vol. 16 (1968), under the section "Polyamide (Plastics)", pages 88–105, particularly page 92- Polylauryllactam (nylon-12), and polyundecanamide (nylon-11), page 101 Solution Processes, and Powder Processing, pages 101–102, the disclosures of which are incorporated herein.

The aminoplasts having alkoxy-alkyl groups useful in the present invention are disclosed in the Kirk-Othmer "Encyclopedia of Chemical Technology", 2nd Ed., Vol. 2 (1963), under the section "Amino Resins and Plastics", pp. 225–258, particularly pages 253 and 254 wherein alkoxymethyl-type monomers and polymers are disclosed.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam in alcohol-water solution and its precipitation as a powder is disclosed. The dispersion of Teflon powder in a solution of epsilon caprolactam and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,299,009 discloses the n-methoxymethylation of nylons, and U.S. Pat. No. 3,410,832 discloses the preparation of polymers and copolymers of lauryllactam.

It is old in the art to use polyamide powders to coat metallic articles with a lacquer-like coating. The production of polyamide powders may be prepared by precipitation from solution, as shown in German application No. S 2805 39b 22/04, by grinding of polyamide granules or by cutting polyamide fibers as disclosed in German Patent No. (DT-AS) 1,604,348. Flame spraying, electrostatic deposition or preferably the fluidized bed method may be employed to coat metal articles with the powdered polyamides.

In addition, polylauryllactam (nylon-12) powder and/or polyundecanamide (nylon-11) powders may be prepared as above indicated and coated on metal articles by the above-noted coating methods. Coatings of the above type are generally inadequately coated on the edges, especially when relatively thick walled, sharp edged metal articles are coated. This is due to formation on both sides of the edges of a bulge or swelling of increased thickness of the polylauryllactam and/or polyundecanamide, whereas the edge itself is not covered at all or at the most is covered with a very thin layer of the polyamide.

Several steps to correct or improve the coating properties of polyamide coating compositions are known.

The flexibility of polylauryllactam coatings is improved when up to 5 percent by weight of a plasticizer is combined with the resin. The powdered resin composition from this additive affords poor edge covering, however.

According to German Patent No. (DT-AS) 1,271,286, the adherence of resins having carbonamide groups coated in the above noted methods may be improved by adding from about 2 to 10 percent by weight of monomers or oligomers with amino, epoxy, carbonyl, hydroxy, nitrile or isocyanate groups which react with the resin in the molten state. The use of polylauryllactam for the carbonamide containing resin, together with these various additives, however, produces poor dry coated edges.

German application (DT-AS) No. 1,694,949 published July 29, 1971 further discloses that one can prepare a stable, homogeneous film forming mass of copolyamides, at least 15 percent by weight with respect to the copolyamide of a precondensation aminoplast resin having alkoxyalkyl groups and an acid catalyst. This composition produces light stable, transparent films and coatings. These film forming compositions must, however, be used in alcoholic solutions since their low softening points do not permit the formation of powdered resins.

It has already been suggested to use polylauryllactam powder containing 30–90 percent by weight polylauryllactam and 70–10 percent by weight of a lauryllactam containing copolyamide for coating metals at high temperatures. These resin powders, to be sure, produce better edge coating, however, a narrow coating temperature range is necessary in order to provide such good edge coating properties. See U.S. Pat. application Ser. No. 283,966, filed Aug. 28, 1972.

SUMMARY OF THE INVENTION

None of the previously disclosed methods permit the preparation of a powder polyamide resin which forms detergent resistant coatings having smooth surfaces and good edge covering when sharp edged, thick walled metal articles are coated at a temperature above the film forming temperature and operable throughout a wide temperature range. The objectives are achieved when powdered polyamides of the following composition are used having a. about 95–99.8 percent by weight polyamide having an average of 8–11 aliphatic connected carbon atoms per carbonamide group;

b. about 0.2–5 percent by weight of an aminoplast having alkoxyalkyl groups, and c. about 0.01–2 percent by weight with respect to the sum of (a) and (b) of an acid catalyst which reacts at the film forming temperature but does not react with either (a) or (b).

DESCRIPTION OF THE PREFERRED EMBODIMENTS

Polylauyrllactam and polyundecanamide having a relative viscosity of about 1.4–2.2, preferably from about 1.5–1.8, in a 0.5 percent metacresol solution at 25°C as measured according to German Industrial Standard (DIN) 53727 is especially suitable for production of powdered polyamide resin coating materials of the invention.

One can also use mixed polyamides or mixtures of homopolyamides, so long as the mixture has on the average 8–11, preferably 9–11 carbon atoms in an aliphatic chain per carbonamide group. The most desired aliphatic chains consist of $CH_2$ groups, however, branched aliphatic chains may also be present. One can also use mixtures having a small proportion of polycaprolactam so long as the average content of carbon atoms per carbonamide group is maintained in the range of 8–11, preferably 9–11. Polylauryllactam (nylon-12) has 11 aliphatic connected carbon atoms per carbonamide group.

The polyamides having an average of 8–11 aliphatic connected carbon atoms per carbonamide group useful in the present application are more fully disclosed in the copending application of Rainer Feldmann, et al filed on the same day as the present application and incorporated by reference above.

Aminoplasts carrying alkoxyalkyl groups within the scope of the invention are those known condensates from alcohols of 1 to 4 carbon atoms, carbonyl compounds with 1–4 carbon atoms and organic materials that have at least 2 amino functions which can react with carbonyl groups such as, e.g. urea, thiourea, cyanamide, melamine or guanamines such as benzoguanamine and acetoguanamine. A great number of materials available in the art are operable in the process. See H. Kittel "Lehrbuch der Lacke und Beschichtungen" (Manual of Lacquer and Coatings), Vol. 1, part 1, pages 383 and 384, (1971). Suitable materials are those aminoplasts which do not exhibit a tendency to self-polymerize but those produced by condensation of methanol, formaldehyde and urea, melamine or benzoguanamine such as bis-(methoxymethyl) urea and partial or completely etherified derivatives of hexamethylolmelamine as well as tetramethylolbenzoguanamine. Extraordinary smooth surfaces and edge coverings are obtained by employing tetrakis-(methoxymethyl)benzoguanamine, bis-(methoxymethyl) urea or with 4 to 6 moles of methanol etherified derivatives of hexamethylomelamine as the alkoxyalkyl groups carrying aminoplasts. Therefore these products are especially suggested. It is also possible to produce fault free coatings on the edges and with respect to the surface properties by using, e.g., butoxymethyl groups carrying precondensated aminoplasts. Specific examples of the aminoplasts of the present invention include: tetrakis-(methoxymethyl)-benzoguanamine; bis-(methoxymethyl)-urea; a partially butylated urea-formaldehyde resin having the commercial designation "Plastopal EBS 200".

The aminoplast is added in such a quantity that the numerical ratio of the carbonamide groups, provided by the polyamide according to the invention, to the alkoxyalkyl groups of the aminoplast lies between 500 and 20 to 1, preferably between 200 and 33 to 1. In order to obtain good edge covering with a smooth surface, according to the invention, the polyamide and aminoplast ratio to be used, depending upon the alkoxyalkyl group equivalent weight of the aminoplasts, is a weight ratio of from 19:1 up to 499:1, preferably 49:1 up to 299:1. This covers a range expressed as weight percent of 95:5 up to 99.8:0.2, preferably 98:2 up to 99.67:0.33.

Acid catalysts of the present invention operable at the film forming temperature include, e.g., mineral acids such as phosphoric acid and its amino salts; polyphosphoric acid; boric acid or the acid ammonium or alkali salts such as monosodiumphosphate, disodiumphosphate, diammoniumhydrogen phosphate; sulphuric acid; sulfonic acids; salts such as ammonium chloride, ammonium sulfate; organic mono- or polycarbonic acid; especially aliphatic mono- or dicarboxylic acids with 1–20 carbon atoms such as capronic acid, succinic acid, adipic acid, dodecanoic acid, formic acid, acetic acid, oxalic acid, fumaric acid, maleic acid, malonic acid; or selected aromatic acids such as trimellitic acids; or lewis acids such as zinc chloride or magnesium fluoride.

One example of an expecially useful catalyst is the combination of equal amounts of weight of tris-(4 alkylphenyl)-phosphites having an alkyl group of 1 to 16 carbon atoms and an ester of 4-hydroxy-3,5-di-tertiarybutylphenyl-propionic acid, the alcoholic component of which is aliphatic having, applied. As a rule, it is advantageous, e.g., 1–18 carbon atoms. The alkyl group of the phosphite can be straight chained as well as branch chained. A preferable example of this catalyst system is a mixture of equal parts by weight of tris-(4-nonylphenyl)-phosphite and pentaerythrite-tetra-3,5-ditertiarybutyl-4-hydroxyphenyl-propionate).

Neither the alkylphenylphosphite nor the 4-hydroxyphenyl-ditertiarybutylphenylpropionic acid is effective alone. As a mixture they are, nevertheless, capable of acting as a catalyst at the film forming temperature of the invention to form acid compounds, a fact which is shown by infrared spectroscopy. Furthermore, mixtures of tris-(4-alkylphenyl)phosphites and 4-hydroxy-3,5-ditertiarybutylphenylpropionic acid derivatives are effective to provide both extraordinary heat and aging resistance to the coatings. For that reason, they are especially useful. In addition to the preferred tris-alkylphenylphosphites, tris-alkyl- or tris-aryl-phosphite, or mixtures of phosphoric acid esters, more particularly triphenyl phosphite, tribenzyl phosphite, diphenyldecylphosphite, didecylphenyl phosphite, triisododecyl phosphite, tris-$\alpha$-ethylhexyl phosphite, dinonylphenyl phosphite, dibutylphenyl phosphite and triscyclohexyl phosphite.

Instead of pentaerythrite one can, e.g., use methyl-, butyl-, nonyl-, decyl- or octadecyl alcohol for the alcohol component in the hydroxyditertiary-butyl-phenyl-propionic acid ester.

Instead of the substituted propionic acid, one can use acids of the following formula:

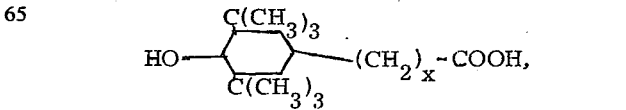

in which x has a value between 0 and 6.

Within the combination of the acids mentioned there are also understood compounds which contain both classes of compound in one molecule.

The above list of operable catalysts is not at all inclusive. Exceptions are of course acids which would chemically react with the polyamides, the aminoplast, other additives or the solvent used to produce the powder, the reaction of which could discolor the powder or the coating.

The amount of catalyst in the coating material is from about 0.01 to 2 weight percent, preferably about 0.05 to 1.5 weight percent with respect to the total weight of polyamide and aminoplast. The optimum amount depends upon the reactivity level of the aminoplast, the acid strength, and the equivalent weight of the catalyst.

Using the above described composition to form a powdered coating material from the above-noted polyamides, alkoxyalkyl groups carrying aminoplasts and an acid catalyst which reacts at the film forming temperature, coatings exhibiting excellent edge covering and good adherence are produced which, in spite of polymerization additives, produced surprisingly smooth surfaces.

By the expression "film forming temperature" is meant a temperature above the melting point of the polyamide used in the coating.

One can use various known methods for the production of powdered polyamide resin compositions to be used in the invention. The choice of any particular one depends upon how the coating is to be in the case of pulverulent coating agents which can be applied electro statically, if all compounds of the coating agent are uniformly distributed in each powder particle. One can achieve this by dissolving the polyamide, the aminoplast and the catalyst in a suitable common solvent such as dimethylformamide or ethylbutanol in which the additives, such as dyes, pigments, flowing agents and stabilizers, are either suspended or dissolved. The mixture is then cooled the solvent evaporated preferably under reduced pressure, and at last the solid mixture is mechanically ground if necessary.

In this way it is also possible to manufacture polyamide powders of high aminoplast content and catalyst content in the form of so-called "masterbatches", which only when mixed dry ("dry blend" process) with pure polyamide or polyamide containing auxiliaries yield coating agents of the composition according to the invention, which are particularly suitable for use as fluidized bed powders.

Of course it is also possible to mix polyamide powder which only contains aminoplast, with powder containing catalyst, for example a powder which already contains sufficient catalyst from its manufacture, and optionally with pure pulverulent polyamide, to give the coating agents according to the invention.

Finally it is even possible to manufacture fluidised bed powders having the favourable properties which have been described by mixing a polyamide powder which contains all auxiliaries, pigments and the catalyst which reacts acid at the film-forming temperature, uniformly distributed in each powder particle, in the dry state with a pulverulent aminoplast which is solid at the fluidised bed temperature, the mixing being carried out, for example, in a fluidised bed. In this case, the made-up polyamide powder can have been manufactured by precipitation from solution and evaporation of the solvent or by grinding polyamide granules.

In principle, all mixing and comminution processes are suitable for the manufacture of the coating agents according to the invention, in which the aminoplast component is exposed to a temperature of at most about 30° below the minimum film-forming temperature, since otherwise crosslinking of the binding agent occurs, which stands in the way of the formation of smooth coatings. It is therefore not possible to obtain the coating agents according to the invention by mixing all the components in the melt, for example in an extruder, with subsequent mechanical comminution of the granules.

When manufacturing the coating agents according to the invention by the solution-precipitation process, temperatures of up to about 150°C are used in order first to dissolve polyamide granules at a high concentration in the solvent used, so that after cooling of the solution the occurrence of a liquid solvent phase is avoided. Before cooling, aminoplast and catalyst and optionally further additives are added to the hot polyamide solution in order to achieve uniform distribution of all components. If there are plant faults in the cooling zone or in the apparatus for expelling the precipitated polyamide binder, the solution of the coating agents according to the invention is frequently exposed to dwell times of a few hours at a temperature of about 150°C. However, during this phase of the manufacture of the powder, a reaction of the aminoplast with the polyamide must be avoided in order to obtain coating agents having the properties described. It is therefore desirable, when using the solution-precipitation process for the manufacture of the coating agents according to the invention, to be able to employ those aminoplasts and catalysts which, in the event of operating faults in the powder production plant, can withstand fairly long dwell times of the hot solution without crosslinking of the binder. Materials which have proved advantageous in this sense are, as the aminoplast carrying alkoxyalkyl groups, tetrakis-(methoxymethyl)-benzoguanamine in amounts of 0.02 to 2 percent by weight, and as the catalyst which reacts acid at the film-forming temperature, a mixture of tris-(4-nonylphenyl)-phosphite and pentaerythritol tetra-(3,5-ditertiary butyl-4-hydroxy-phenylpropionate) in amounts of 0.1 to 1 percent by weight each, relative to the sum of polyamide + aminoplast. The use of these components, in the indicated amounts, for the manufacture of the coating agents based on polyamides, of the type described, which accord with the invention and can be applied as powders, is therefore particularly preferred. This procedure makes it possible to manufacture outstandingly smooth coatings with excellent edge covering from the pulverulent coating agent even if the solution of the components in the dimethylformamide preferentially to be used as the solvent is kept at 150°C over a period of 7 hours.

In addition, the use of tetrakis-(methoxymethyl)-benzoguanamine as an aminoplast carrying alkoxyalkyl groups has also proved particularly valuable, because of its high melting point, its fine crystalline consistency and its reactivity behaviour, for the manufacture of the coating agents according to the invention by the various dry mixing processes ("dry blend" processes), both by the method of processing concentrates rich in aminoplast ("masterbatches") and in the case of simple mixing of polyamide, containing catalyst, with pure aminoplast.

In manufacturing the modified polyamide powders it must be borne in mind that the various additives influence the coating properties. The quality of the coatings obtained from the powders according to the invention depends on the nature and amount of the aminoplast, on the nature and amount of the added acid catalyst and also on the nature and amount of the added pigment, for example $TiO_2$. Thus, for each powder formulation according to the invention, the nature and amount of the additives must carefully be matched to one another. The higher is the reactivity of the aminoplast, the lower must its amount be. Furthermore it is advisable to determine the optimum amount for each catalyst which reacts acid at the film-forming temperature, by preliminary experiments, since there is no relationship between the known pKa values and the effect of accelerating the crosslinking. The amount is generally between 0.1 and 1 percent by weight of the binder. When manufacturing powder with, for example, $TiO_2$ pigment in the customary amount of about 7.5 percent by weight of the mixture, it is necessary to note that the amount of aminoplast required for optimum coatings must be chosen to be about 2 to 3 times greater than in the case of pigment-free powders. These preliminary experiments are necessary in order to provide pulverulent coating agents of polyamide, which ensure good edge coating and a smooth surface. If the edge coating properties are poor, an improvement can be achieved by increasing the reactivity or the amount of the aminoplast, by increasing the reactivity or the amount of the catalyst and by reducing the amount of pigment added. Knowing these relationships it is directly possible to arrive at optimum coating agents, with regard to coating properties, within the framework of the concentration ranges according to the invention, with the aid of a few exploratory preliminary experiments.

The amount of the solvent is not critical. Hence, only such an amount will be chosen that at the temperatures used the polyamides, the aminoplast and the soluble organic constituents, whether they be acid catalysts or stabilisers or anti-aging agents, give a clear solution. In general, 190 to 400, especially 200 to 250, parts by weight of solvent suffice per 100 parts by weight of the compounds mentioned.

The compounds mentioned are added to the solvent; appropriately, the polyamide is first dissolved and the abovementioned constituents are added to the solution which has been warmed to about 100° to 180°C, preferably 130° to 160°C. If salts or pigments are added, uniform distribution of the additives in the solution is brought about by stirring. The solution thus obtained is subsequently cooled in a known manner to room temperature (20°–25°C), in general maintaining a temperature drop of between 0.1° and 10°C per second. The powder which has precipitated and which contains both N-alkoxymethyl groups and acid catalysts in uniform distribution is subsequently ground in a hammer mill, especially if powder is not produced directly, and is freed of residual solvent under reduced pressure, if necessary at elevated temperature. In general, a pressure of 0.1 to 20 mm Hg and a temperature of 30° to 100°C, especially a pressure of 0.5 to 5 mm Hg and a temperature of 50° to 70°C, suffice for this purpose.

The powders obtained have a particle size of 20 to 500µ with a particle size distribution of about 85% between 60 and 200µ. For electrostatic coating, powders with particle sizes in the lower range are appropriately used, whilst those in the middle range are used for the fluidised bed process. The powders are particularly suitable for coating metals by the fluidised bed process or also by the flame spraying process or the electrostatic coating process. The metlas coated with the powders show particularly good adhesion and in particular the edges of thicker articles are uniformly coated.

Examples of the overall combination polyamide with an average of 8–11 aliphatic connected carbon atoms per carbonamide group, aminoplast carrying alkoxyalkyl groups and acid catalyst reactive at the film forming temperature include, in parts by weight:

400 polylauryllactam, 2 tris-(4 nonylphenyl)-phosphite, 2 pentaerythrite tetra-(3,5-ditertiarybutyl-4-hydroxyphenylpropionate), 12 of a 60 percent by weight solution of partially butylated urea-formaldehyde resin in butanol having the commercial designation "Plastopal EBS 200";

400 polylauryllactam, 7.2 tetrakis (methoxymethyl)-benzoguanamine, 0.1 maleic acid;

400 polylauryllactam, 7.2 tetrakis(methoxymethyl)-benzoguanamine, 0.5 malonic acid;

400 polyundecanamide, 3 tris-(4 nonylphenyl)-phosphite, 3 pentaerylthrite-tetra-(3,5-ditertiary-4-hydroxyphenylpropionate), 8 tetrakis-(methoxymethyl)-benzoguanamine;

200 polyundecanamide, 200 polylauryllactam, 3 tris-(4 nonylphenyl)-phosphite, 3 pentaerythrite-tetra-(3,5-ditertiary-4-hydroxyphenylpropionate), 8 tetrakis-(methoxymethyl)-benzoguanamine;

400 polylauryllactam, 7.2 tetrakis(methoxymethyl)-benzoguanamine, 0.2 phosphoric acid.

The disclosure of the copending application of Rainer Feldmann et al, filed on the same day as the present application has been incorporated herein where the polyamide having an average of about 8–11 aliphatic carbon atoms per carbonamide group is defined as being selected from the group consisting of polylauyrllactam, polyundecanamide, polydecanamide, polynonanamide, polyhexamethylendodecanicacid amide, polydodecamethylene-adipamide mistures and copolyamides, thereof and mixtures and copolyamides thereof with a second polyamide selected from the group consisting of polycaprolactam, polyhexamethylenadipamide, polyhexamethylensebacamide, polyhexamethyleneazelaic acid amide, polycapryllactam, copolymers thereof and mixtures thereof.

To explain the average of about 8–11 aliphatic carbon atoms per carbonamide group is called e.i. example 14. A copolymer consisting of 60 percent lauryllactam, 25 percent caprolactam and 15 percent adipic acid/hexamethylene diamine salt has an average of $[4 \times 5 + 6 \times 11]/10 = 8.6$ carbon atoms per carbonamide group.

The following specific examples further explain the advantages of the invention.

EXAMPLES

Production and Testing of the Coatings

The powder is produced according to the following examples. The powder is separated into a particle size of between 60 and 500 microns by passing it through a sieve after having removed the solvent under vacuum.

A test article consisting of a steel block measuring 14 × 25 × 80 mm is coated in a fluidized bed. The test body, heated to 240°–260°C, is immersed from 2 to 3 seconds in a fluidized bed of polyamide powder and finally cooled in the air. The coating thickness is 200–300 microns which can be substantiated by a magnetic coating thickness meter. The value "1" is given when the thickness of the edge is at least ⅔ the thickness of the broad surface; the value "2" denotes a thickness of ⅓ the broad surface; the value "3" is given when a noticeable coating on the edge is present; the value "4" when a thin coating can be scraped off with a knife; and the value "5" when no coating at all is discernible.

COMPARATIVE EXAMPLE 1

400 grams of granulated polylauryllactam having a relative solution viscosity of about 1.6 is mixed together with 2 grams of tris-(4-nonylphenyl)-phosphite consisting of 0.5 percent by weight and 2 grams of pentaerythrittetra-(3,5-ditertiarybutyl-4-hydroxy-phenylpropionate) also consisting of 0.5 percent by weight and 30 grams of $TiO_2$ pigment and heated to boiling under a pure nitrogen atmosphere, together with 900 grams of dimethylformamide for 5 hours. After cooling, the powder was dried and separated as to particle size as indicated above. Articles coated with the powder had a smooth surface but exhibited faulty edge covering. Bulges of polylauryllactam were found on both sides of the edges of the coated article. The value was "4" to "5".

COMPARATIVE EXAMPLE 2.

In the method of Comparative Example 1, 6.4 grams of 1.6 percent by weight dimethylolurea was substituted for the acid catalyst. Edge value "4" was obtained after coating in a fluidized bed which otherwise produced a satisfactory coating. See DT-AS 1,271,286.

EXAMPLE 1.

400 grams of granulated polylauryllactam having a relative solution viscosity of about 1.6 is mixed, together with 2 grams of 0.5 percent by weight tris-(4 nonylphenyl)-phosphite and 2 grams of 0.5 percent by weight pentaerythrite tetra-(3,5-ditertiarybutyl-4-hydroxyphenyl-propionate), 12 grams of a 60 percent by weight solution of a commercial, precondensed, partially butylated urea-formaldehyde resin in butanol (corresponding to 1.8 percent by weight) and 30 grams of $TiO_2$ pigment and heated to boiling in the presence of 900 grams of dimethylformamide for 1.5 hours under a pure nitrogen atmosphere. The powder was dried and separated as to size as indicated above. A good edge coating value "2" was obtained upon coating articles in a fluidized bed.

EXAMPLE 2.

The method of Example 1 was repeated, except that instead of the urea-formaldehyde resin, 4 grams of 1 percent by weight commercial hexamethoxymethylmelamine was substituted. Good edge coatings of value "1" were obtained by fluidized bed coating which also had smooth surfaces.

EXAMPLE 3.

The dependence of the coating properties upon the aminoplast is shown in the following Table. The powders were prepared in each case according to the method in Example 1 with the given amount of hexakis-(methoxymethyl)-melamine instead of the urea-formaldehyde resin.

| Amount (grams) | % by weight | Edge Coating Value | Surface |
|---|---|---|---|
| 3 | 0.75 | 2 | smooth |
| 4 | 1.0 | 1 | smooth |
| 5.8 | 1.45 | 1 | nearly smooth |

EXAMPLE 4.

The dependence of the coating quality upon the type and amount of catalyst is shown in the following Table. The powder in each case was produced according to the method set out in Example 1 except that 7.2 grams of tetrakis (methoxymethyl)-benzoguanamine was substituted for the urea-formaldehyde and instead of the two catalysts, tris-(4 nonylphenyl)-phosphite and pentaerythrite tetra-(3,5-ditertiarybutyl-4-hydroxyphenyl-propionate) other catalysts were substituted.

| Catalyst | Amount (grams) | Wt.% | Edge coating | Surface |
|---|---|---|---|---|
| maleic acid | 0.1 | 0.025 | 1 | nearly smooth |
| maleic acid | 0.5 | 0.125 |  | polymerized by powder production |
| malonic acid | 0.5 | 0.125 | 1–2 | nearly smooth |
| Tris-(4 nonylphenyl)-phosphite and pentaerythrite-tetra-(3,5-ditertiary-butyl-4-hydroxy phenyl propionate | each 2 | 0.5 | 1 | smooth |

EXAMPLE 5

The powder is again prepared according to the method of Example 1 except that instead of the urea-formaldehyde resin, 7.2 grams (1.8 percent by weight) tetrakis-(methoxymethyl)-benzoguanamine is substituted. The solution is heated at the boiling point for 7 hours instead of 1½ hours. Articles coated by fluidized bed had very good value "1" edge coatings and smooth surfaces.

EXAMPLE 6.

The influence of the amount of the added $TiO_2$ powder is shown by the following comparison: A powder is prepared according to Example 5 which contains no $TiO_2$. The edge covering of the test articles had extraordinary covering, however, the broad surfaces were rough and porous. Should the amount of the tetrakis(-methoxymethyl)-benzoguanamine from otherwise the same recipe be reduced to 3.6 grams (0.9 percent by weight), the test coating showed a very good edge covering value "1" and smooth surfaces.

EXAMPLE 7.

Production of a "master batch" 300 grams of granulated polylauryllactam having a relative solution viscosity of about 1.6 is mixed with 100 grams (25 percent by weight)tetrakis-(methoxymethyl)benzoguanamine, 2 grams (0.5 percent by weight)tris-(4 nonylphenyl)-phosphite and 2 grams (0.5 percent by weight)pentaerythrite tetra-(3,5-ditertiary-butyl-4-hydroxyphenylpropionate) in 800 grams of dimethylformamide and heated it to boiling point for 1½ hours under a pure nitrogen atmosphere. The drying and separating was done as indicated above for the other powders. 5 grams of this "master batch" is mixed with 200 grams of polylauryllactam powder which, like Example 1, included no $TiO_2$ pigment. Good edge coatings were obtained by fluidized bed of value "2" with smooth surfaces.

EXAMPLE 8.

200 grams of polylauryllactam prepared according to Comparison Example 1 without $TiO_2$ is mixed with 2 grams (1 percent by weight)tetrakis-(methoxymethyl)-benzoguanamine in a fluidized bed. Articles coated exhibited very good value "1" edge coatings with smooth surface coating.

EXAMPLE 9.

400 grams of granulated polyundecanamide having a relative solution viscosity of about 1.6 is mixed with 3 grams (0.75 percent by weight)tris-(4-nonylphenyl)-phosphite, 3 grams (0.75 percent by weight)pentaerythrite-tetra-(3,5-ditertiary-4-hydroxyphenylpropionate), 8 grams (2 percent by weight)tetrakis-(methoxymethyl)-benzoguanamine, 30 grams of $TiO_2$ pigment and 900 grams of dimethylformamide. The mixture is heated to boiling under pure nitrogen for 3 hours. The powder is dried and separated as above indicated. Good edge coatings, with value of "1" having smooth surface were obtained by the fluidized bed process.

EXAMPLE 10.

The preparation of Example 9 with the exception that instead of polyundecanamide, a mixture of 200 grams of polyundecanamide having a relative solution viscosity of about 1.6 and 200 grams of polylauryllactam having a relative solution of 1.6 was substituted. Very good value "1" edge coatings having smooth surfaces were obtained.

EXAMPLE 11.

200 grams of polylauryllactam having a relative solution viscosity of about 1.5 and 200 grams of a copolymer of 80 percent lauryllactam and 20 percent by weight caprolactam having a relative viscosity of about 1.75 were mixed together with 1 gram (25 percent by weight)tris-(4-nonylphenyl)-phosphite and 1 gram of 0.25 percent by weight pentaerythrite-tetra-(3,5-dietertiarybutyl-4-hydroxyphenylpropionate) and 3.2 grams (0.8 percent by weight) tetrakis-(methoxymethyl)-benzoguanamine was heated at the boiling point for 7 hours in 800 grams of dimethylformamide under a pure nitrogen atmosphere. The powder was dried and separated as above. Test coated articles had edge values "1" with very good surface coatings and smooth surfaces.

EXAMPLE 12.

200 grams of polyundecanamide having a relative solution viscosity of about 1.7, 200 grams of a copolymer consisting of 80 percent by weight lauryllactam and 20 percent by weight caprolactam having a relative solution viscosity of about 1.75 is mixed with 2 grams (0.5 percent by weight)tris-(4 nonylphenyl)-phosphite and 2 grams (0.5 percent by weight)pentaerythrite-tetra-(3,5-ditertiary-butyl-4-hydroxyphenylpropionate), 6 grams (1.5 percent by weight) tetrakis-(methoxymethyl)-benzoguanamine and 30 grams $TiO_2$ pigment, heated for 2 hours at the boiling point, together with 900 grams of dimethylformamide under a pure nitrogen atmosphere. Articles coated by fluidized bed exhibited very good values "1" edge coatings and smooth surfaces.

EXAMPLE 13.

320 grams of polylauryllactam having a relative viscosity of about 1.6, 80 grams of a copolymer consisting of 40 percent by weight lauryllatam, 30 percent by weight caprolactam and 30 percent by weight dodecanoic acid-hexamethylendiamine-salts having a relative solution viscosity of about 1.6 were mixed together with 2 grams (0.5 percent by weight)tris-(4 nonylphenyl)-phosphite and 2 grams (0.5 percent by weight)pentaerythrite-tetra-(3,5-ditertiary-4-hydroxy-phenylpropionate), 7.2 grams (1.8 percent by weight)tetrakis-(methoxymethyl)-benzoguanamine and 30 grams of $TiO_2$ pigment in 900 grams of dimethylformamide and were heated to the boiling point for 2 hours under pure nitrogen. Articles coated by the fluidized bed sintering method had very good values "1" edge coatings and smooth surfaces.

EXAMPLE 14.

The method of Example 12 was repeated, except that instead of the copolymer employed in the example, a copolymer consisting of 60 percent lauryllactam, 25 percent caprolactam and 15 percent adipic acid-hexamethylenediamine salt is substituted. Test articles coated with the powder exhibited very good values "1" edge coatings with smooth surfaces.

We claim:

1. Polyamide base powder compositions consisting essentially of a plurality of finely divided particles, said plurality of finely divided particles being uniform, or a mixture of distinct particles, said plurality of finely divided particles having therein on an average:
   a. about 95 to 99.8 percent by weight of polyamide with an average of 8 to 11 aliphatically linked carbon atoms per amide group;
   b. about 0.2 to 5 percent by weight of an aminoplast bearing alkoxyalkyl groups; and
   c. about 0.01 to 2 percent by weight, relative to the sum of (a) and (b), of a catalyst which has an acidic reaction at the film forming temperature.

2. Polyamide base powder coating compositions consisting essentially of a plurality of finely divided particles, said plurality of finely divided particles being uniform or a mixture of distinct particles, said plurality of finely divided particles having therein on an average:
   a. about 95 to 99.8 percent by weight of a polyamide having an average of about 8–11 aliphatic carbon atoms per carbonamide group selected from the group consisting of polylauryllactam, polyundecanamide, mixtures thereof and mixtures thereof with a second polyamide selected from the group consisting of polycaprolactam, polyhexamethyleneadipamide, polydodecamethyleneadipamide, polyhexamethylenesebacamide, polyhexamethyleneagelaic acid amide, polycapryllactam, copolymers thereof and mixtures thereof;

b. about 0.2 to 5 percent by weight of an aminoplast carrying alkoxyalkyl groups; and c. about 0.01 to 2 percent by weight with respect to the total amount of (a) and (b) of an acid catalyst reactive with (a) and (b) at the temperature of film forming.

3. The polyamide base powder coating compositions of claim 2, wherein said powder is prepared by solution coprecipitation and has a particle size of about 20 to 500 microns.

4. The polyamide base powder coating composition of claim 2, wherein said powder is a ground mixture having a particle size of about 20 to 500 microns.

5. The polyamide base powder coating composition of claim 2, wherein said aminoplast carrying alkoxyalkyl groups is about 0.2–2 percent by weight.

6. The polyamide base powder coating compositions of claim 5, wherein said aminoplast alkoxyalkyl carries methoxymethyl groups.

7. The polyamide base powder coating compositions of claim 6, wherein said aminoplast carrying methoxymethyl groups is selected from the group consisting of condensation products of formaldehyde, methanol and urea; formaldehyde, methanol and melamine; or formaldehyde, methanol and benzoguanamine.

8. The polyamide base powder coating compositions of claim 6, wherein said aminoplast carrying methoxymethyl groups is tetrakis-(methoxymethyl)-benzoguanamine.

9. The polyamide base powder coating compositions of claim 2, wherein said acid catalyst is selected from the group consisting of aliphatic monocarboxylic acids having 1–20 carbon atoms and aliphatic dicarboxylic acids having 1–20 carbon atoms.

10. The polyamide base powder coating compositions of claim 2, wherein said acid catalyst has a concentration of about 0.1–1 percent by weight and is selected from the group consisting of trisalkylphenyl ester of phosphoric acid, trialkyl ester of phosphoric acid, trisaryl ester of phosphoric acid and mixtures of esters of phosphoric acids whose alkyl group contains 1–16 carbon atoms having straight chained or branched chains and about 0.1–1 percent by weight of an ester of 4-hydroxy-3,5-ditertiary-butylphenyl monocarboxylic acid of the general formula

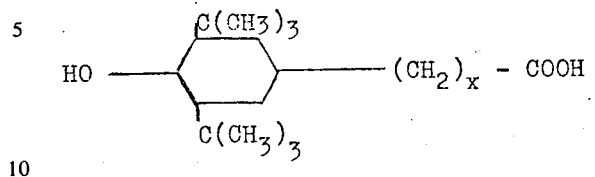

where $x$ has a value of between 0–6, with an aliphatic alcohol of 1–18 carbon atoms.

11. The polyamide base powder coating compositions of claim 10, wherein said acid catalyst is a tetrapentaerythrite ester of 4-hydroxy-3,5-ditertiary-butylphenylpropionic acid having a concentration of about 0.1–1 percent by weight and a tris-nonyl-phenyl ester of phosphoric acid having a concentration of about 0.1–1 percent.

12. A method for producing a polyamide base powder for coating compositions consisting essentially of dissolving in an organic solvent at an elevated temperature:

a. about 95–99.8 percent by weight of a polyamide having an average of about 8–11 aliphatic carbon atoms per carbonamide group;

b. about 0.2–5 percent by weight of tetrakis-(methoxymethyl)benzoguanamine; and c. an acid catalyst comprising about 0.1–1 percent by weight trisnonylphenylphosphite and 0.1–1 percent by weight pentaerythrite-tetra-(3,5-ditertiary-butyl-4-hydroxyphenylpropionate) to form a solution, cooling the solution to precipitate said base powder and separating said base powder from said solvent.

13. A method of claim 12, wherein said polyamide of (a) is selected from the group consisting of polylauryllactam, polyundecanamide, mixtures thereof and mixtures thereof with a second polyamide selected from the group consisting of polycaprolactam, polyhexamethyleneadipamide, polydodecamethyleneadipamide, polyhexamethylenesebacamide, polyhexamethyleneagelaic acid amide, polycapryllactam, copolymers thereof and mixtures thereof.

14. The method of claim 13, wherein the concentration of said tetrakis-(methoxymethyl)-benzoguanamine is about 0.2–2 percent, said solvent is removed under pressure reduced below atmospheric, and said base powder is ground.

* * * * *